Sept. 25, 1951 W. H. NORDENSON ET AL 2,568,928
BOLT RETAINER AND ATTACHING STRUCTURE FOR
AGRICULTURAL TRACTORS AND IMPLEMENTS
Filed Dec. 29, 1949
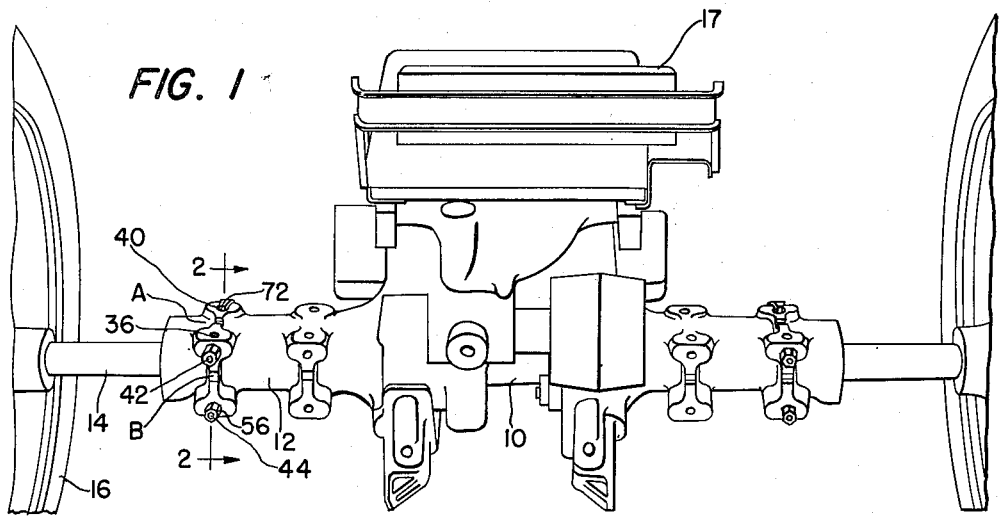
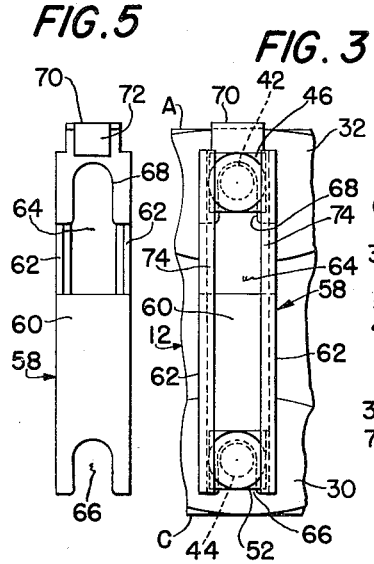
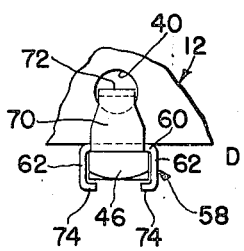
*INVENTORS*
W. H. NORDENSON &
D. J. MIHAL
ATTORNEYS Patented Sept. 25, 1951

2,568,928

UNITED STATES PATENT OFFICE 2,568,928

BOLT RETAINER AND ATTACHING STRUCTURE FOR AGRICULTURAL TRACTORS AND IMPLEMENTS

Willard H. Nordenson and Dan J. Mihal, Dubuque, Iowa, assignors to Deere Manufacturing Co., Dubuque, Iowa, a corporation of Iowa Application December 29, 1949, Serial No. 135,644

9 Claims. (Cl. 280—150)

This invention relates to bolt retainer and attaching structure and more particularly to improvements in that character of attaching structures used for the purpose of mounting implements on agricultural tractors.

The conventional agricultural tractor is of the row-crop type having a longitudinal narrow body carried at its rear end on a pair of relatively widely spaced traction wheels and at its front end on a steerable truck having either one wheel or a pair of relatively closely spaced wheels. Tractors of this type and implements usable therewith are primarily designed for the purpose of integrating the tractor and such implements, so that the tractor may be used with a variety of implements, such as planters, cultivators, etc. The integrated implements include attaching structure, the design of which is common to all implements of a particular class and cooperative with complementary attaching structure on the tractor. Obviously, the use of the tractor with several different implements is facilitated by attaching structure that is convenient and easy to manipulate.

Accordingly, it is a principal object of the present invention to improve attaching structure of the character referred to above. Primarily, it is an important object of the invention to provide bolt-retaining means on the tractor which facilitates mounting of implements on the tractor to the end that the retaining means holds the bolts in place while the implement is being attached. It is an important object of the invention to provide the bolt-retaining means in the form of an element capable of holding the bolts against axial displacement and at the same time holding the bolts against rotation.

A further important object of the invention is to improve the attaching structure on the tractor, primarily by incorporating in the tractor a rear axle design comprising at each side of the tractor a laterally extending axle housing provided with a plurality of intersecting bores which respectively open to opposite mounting surfaces, whereby a variety of implements may be attached to any one or more of the mounting surfaces selectively.

The foregoing and other important objects and desirable features inherent in and encompassed by the invention will become apparent to those versed in the art as a preferred embodiment of the invention is fully disclosed in the following detailed description and accompanying sheet of drawings, in which:

Figure 1 is a perspective view of the rear portion of the tractor showing the improved attaching structure;

Figure 2 is an enlarged transverse sectional view taken substantially along the line 2—2 of Figure 1;

Figure 3 is a fragmentary view, in plan elevation, of the structure shown in Figure 2;

Figure 4 is a fragmentary view, in plan, of the structure shown in Figures 2 and 3; and Figure 5 is a face view of the connector or retainer channel as seen from the direction indicated by the arrows on line 5—5 of Figure 2.

In so far as the broad principles of the invention are concerned, the attaching structure may be utilized elsewhere than in the specific tractor instance illustrated. Therefore, to this extent, the illustration should be taken as representative and not limiting.

The tractor chosen for the purposes of illustration is of one well-known make having a body 10 provided at each side thereof with a laterally outwardly extending axle housing 12. Since these housings are symmetrical, a description of one will suffice as a description of the other and further reference will be had solely to the axle housing appearing at the left-hand side of Figure 1.

Each axle housing journals a driving axle 14 to which is keyed a traction wheel 16. The rear portion of the body 10 carries an operator's seat 17. To the extent thus far described, the tractor design is typical of many agricultural tractors currently known.

As best shown in Figure 2, the axle housing 12 is provided with a hollow interior which receives the axle 14. The exterior of the axle housing is provided with a plurality of mounting surfaces designated generally by the letters A, B, C and D. These surfaces are arranged respectively as the sides of a square about the principal axis of the housing 12, giving the axle housing a polygonal cross-section. In the presently illustrated instance, each surface is made up of a pair of mounting pads lying in the plane of the respective surface, those for the surface A being indicated at 18 and 20, those for the surface B being designated by the numerals 22 and 24, and those for the surfaces C and D being designated by the numerals 26, 28 and 30, 32, respectively.

The axle housing 12 is provided with four bores 34, 36, 38 and 40 which lie respectively on four intersecting axes inwardly of and respectively paralleling the aforesaid four mounting surfaces A, B, C and D. The bore 34 opens at its opposite ends respectively through the surfaces B and D, as does the bore 38. The opposite ends of each of the bores 36 and 40 open respectively at the surfaces A and C.

The bores are selectively adapted to receive a pair of securing members in the form of bolts 42 and 44. As illustrated, the bolts 42 and 44 are passed respectively through the horizontal bores 34 and 38. The bolt 42 is headed at one end at 46 and its other end is threaded at 48 to receive a nut 50. The two bolts are identical and the bolt 44 has a head 52 and a threaded end 54 adapted to receive a nut 56 (Figure 1). It is obvious, of course, that the bolts, or either of them, could be arranged in the vertical bores 36 and 40.

The bolts 42 and 44, arranged in the horizontal positions illustrated, have their threaded ends 48 and 54 facing rearwardly, so that, when the nuts 50 and 56 are removed, an implement or equivalent structure may be attached to the axle housing 12, such structure abutting the attaching or mounting face B and being secured by the replaced nuts 50 and 56. Similarly, implement or equivalent structure may be secured to either of the upper or lower attaching or mounting surfaces A or C, or to the front surface D.

In order that the bolts 42 and 44 may be retained in place while the implement or equivalent structure is being attached, there is provided a connecter element positionable along that one of the mounting surfaces at which the heads of the bolts project. This element comprises an elongated channel 58 which has a bottom 60 and a pair of side walls 62. The bottom 60 is provided with a pair of apertures 64 and 66 spaced lengthwise of the channel (Figure 5). The upper aperture is in the form of a keyhole opening having a rectangular portion sufficiently large to receive the head 46, for example, of the bolt 42. The rectangular opening communicates with a slot 68 which has a width sufficient to receive the shank of the bolt 42, for example. The lower aperture 66 is in the form of a slot that opens outwardly at the lower end of the channel. The width of the slot or aperture 66 is sufficient to receive the body of the bolt 44, for example.

The connecter or channel element is designed so that it may be assembled to the axle housing 12 with the bolts 42 and 44 in place. The nuts 50 and 56 are slightly loosened so that the heads 46 and 52 of the bolts may be spaced away from the mounting surface D. The channel element is put in place by slipping the aperture 64 over the bolt head 46 and by then moving the channel downwardly so that the slotted portions 66 and 68 engage respectively behind the bolt heads 52 and 46. To further facilitate the mounting of the connecter or channel, the upper portion of the bottom 60 thereof is extended as a tongue 70 to provide retaining means having a hook portion 72 receivable in the open end of the proximate bore—in the illustration of Figure 2 being retained in or received by the upper open end of the bore 40. Hence, the connecter or channel cannot be accidentally dislodged.

The transverse spacing between the side walls 62 of the channel is such that the bolt heads 46 and 52 are easily received therein, and the tolerance is such that the bolts cannot be rotated, since the flat sides of the bolt heads will engage the opposite sides 62 of the channel member. In order that the bolts may be prevented from becoming dislodged lengthwise or axially thereof, each of the side walls 62 is provided with retaining means in the form of a wing portion 74 bent inwardly toward the opposite side wall so as to overlie the bolt heads (see Figure 4).

The use of the improved attaching structure is characterized in that the bolts 42 and 44 are retained in place while connection is made with an implement or equivalent structure. That is, the bolts are retained in place by the connecter or channel member 58 and accidental misalinement of the openings in the implement structure and the ends of the bolts will not result in axial displacement of the bolts, since they are retained by the wing portion 74 on the channel member. Inasmuch as the hook portion 72 on the retaining means 70 engages the upper end of the bore 40, the channel member itself cannot be displaced. Further, after the implement or equivalent structure is in place, the bolts 42 and 44 are held against rotation while the nuts 50 and 56 are applied.

Other objects and features of the invention not specifically enumerated above will undoubtedly occur to those versed in the art, as will numerous modifications and alterations in the preferred embodiment of the invention illustrated, all of which may be achieved without departing from the spirit and scope of the invention as defined in the appended claims.

What is claimed is:

1. Implement attaching structure for a tractor or the like having a longitudinal body and a pair of elongated, oppositely laterally outwardly extending axle housings, characterized in that: each axle housing has four external mounting surfaces grouped about the outside of the axle housing to form a square about the principal axis of the axle housing; means providing four bores through the housing respectively on four intersecting axes inwardly of and respectively paralleling the aforesaid four mounting surfaces, each bore opening at opposite ends thereof respectively to opposite parallel mounting surfaces; a connecter element positionable along one mounting surface and having a pair of apertures therein spaced apart on the order of and alinable with the pair of parallel bores that open at said one mounting surface; a pair of securing members passed respectively through the apertures and through the bores with which said apertures are alined, each of said securing members having at one end thereof means engaging the connecter element and at the other end thereof means for engaging the mounting surface opposite said one mounting surface; and retaining means on the connecter element for engaging one of the other bores.

2. The invention defined in claim 1, further characterized in that: the four mounting surfaces are so arranged that two of said surfaces are respectively top and bottom, substantially horizontal surfaces, and the other two surfaces are respectively front and rear surfaces; the securing members pass through the bores parallel to the top and bottom surfaces; and said retaining means includes a portion engageable with the top surface and having a hooked end receivable by one of the other bores that opens to said top surface.

3. The invention defined in claim 1, further characterized in that: the bores are of substantially the same diameter and length; and the securing members are similar so that said members will fit either pair of bores and said retaining means will fit any bore.

4. The invention defined in claim 1, further characterized in that: each securing member is in the form of a headed bolt, the head of which forms the means engaging the connecter element, and each bolt has a threaded end and a cooperative nut forming the means for engaging the opposite mounting surface; and the connecter element has means thereon engaging the bolt heads to prevent rotation of the bolts.

5. The invention defined in claim 4, further characterized in that: said connecter element has means thereon engaging the bolts to prevent displacement of the bolts in the direction axially of the bolts and opposite to the direction of insertion thereof in said pair of bores.

6. The invention defined in claim 5, further characterized in that: the connecter element is in the form of a channel having sides engaging the sides of the bolt heads, and integral portions respectively on the channel sides and bent inwardly to engage the outer ends of the bolt heads.

7. Implement attaching structure for a tractor or the like having a longitudinal body and a pair of elongated, oppositely laterally outwardly extending axle housings, characterized in that: each axle housing has a pair of angularly related mounting surfaces and is further formed with a pair of bores whose axes lie respectively in intersecting planes, one bore being normal to and opening outwardly at one mounting surface, and the other bore being normal to and opening outwardly to the other mounting surface; a connecter element positionable against one mounting surface and having an aperture therein alinable with the bore that is normal to said one surface; a securing member passed through said alined aperture and bore; and retaining means connected to the connecter element and shaped to hook over the other mounting surface and having a portion receivable in the other bore.

8. First and second connectible elements and means for interconnecting the same, characterized in that the first element has a pair of angularly related mounting surfaces and is further formed with a pair of bores whose axes lie respectively in intersecting planes, one bore being normal to and opening outwardly at one mounting surface, and the other bore being normal to and opening outwardly to the other mounting surface; the second element is positionable against one mounting surface and has an aperture therein alinable with the bore that is normal to said one surface; a securing member passed through said alined aperture and bore; and retaining means connected to the second element and shaped to hook over the other mounting surface and having a portion receivable in the other bore.

9. A connecter of the character described, comprising an elongated sheet metal channel having a bottom and parallel side walls, each side wall at its free edge having a portion thereof bent inwardly toward the other side wall, said portions overlying and spaced from the bottom of the channel to at least partially enclose the open side of the channel, said channel bottom having at one end thereof a bolt-receiving slot therethrough opening to said end and extending only part way toward the other end of the channel, said channel bottom having intermediate its ends and separated from said bolt-receiving slot an enlarged aperture substantially as wide as the spacing between the interior surface of the channel side walls for receiving the head of a second bolt, said other end of the channel bottom having a slot therethrough closed at said other end but opening to said bolt-head-receiving aperture for receiving the shank of such second bolt, and said other end of the channel having thereon a hook extending first away from the channel bottom in a direction opposite the channel side walls and extending then in the direction toward but terminating short of the closed end of said second bolt-receiving slot.

WILLARD H. NORDENSON.
DAN J. MIHAL.

REFERENCES CITED

The following references are of record in the file of this patent:

UNITED STATES PATENTS

| Number | Name | Date |
| --- | --- | --- |
| 252,716 | Beamer | Jan. 24, 1882 |
| 394,462 | Cook | Dec. 11, 1888 |
| 733,915 | Pike | July 14, 1903 |
| 1,875,209 | Baldwin | Aug. 30, 1932 |
| 1,931,899 | McLeod | Oct. 24, 1933 |
| 2,090,891 | Kuns | Aug. 24, 1937 |
| 2,176,326 | Brown | Oct. 17, 1939 |

FOREIGN PATENTS

| Number | Country | Date |
| --- | --- | --- |
| 44,597 | Netherlands | Dec. 15, 1938 |